US012589504B2

(12) United States Patent
Banerjee et al.

(10) Patent No.: US 12,589,504 B2
(45) Date of Patent: Mar. 31, 2026

(54) SYSTEM AND METHOD FOR COGNITIVE SURVEILLANCE ROBOT FOR SECURING INDOOR SPACES

(71) Applicant: Tata Consultancy Services Limited, Mumbai (IN)

(72) Inventors: Snehasis Banerjee, Kolkata (IN); Abhijit Kumar, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 93 days.

(21) Appl. No.: 18/814,644

(22) Filed: Aug. 26, 2024

(65) Prior Publication Data

US 2025/0091217 A1     Mar. 20, 2025

(30) Foreign Application Priority Data

Sep. 20, 2023    (IN) .............................. 202321063075

(51) Int. Cl.
*B25J 9/16*         (2006.01)
*B25J 19/02*        (2006.01)

(52) U.S. Cl.
CPC ............. *B25J 9/1697* (2013.01); *B25J 9/161* (2013.01); *B25J 9/163* (2013.01); *B25J 19/023* (2013.01)

(58) Field of Classification Search
CPC . B25J 9/1697; B25J 9/161; B25J 9/163; B25J 19/023; G06N 3/045; G06N 5/022;
(Continued)

(56) References Cited

U.S. PATENT DOCUMENTS 10,671,892 B1 *   6/2020  Daskalov .............. G06F 18/214
11,681,364 B1 *   6/2023  Zhang .................. G06N 3/0455
                                                          345/156
(Continued)

FOREIGN PATENT DOCUMENTS

CN        104267731 A      1/2015

OTHER PUBLICATIONS

Afif et al., "A Novel Dataset for Intelligent Indoor Object Detection Systems," Artificial Intelligence Advances, 1(1) (2019).
(Continued)

*Primary Examiner* — Sihar A Karwan
(74) *Attorney, Agent, or Firm* — Finnegan, Henderson, Farabow, Garrett & Dunner, LLP

(57)        ABSTRACT

Existing works on surveillance robots in indoor scenarios focus only on specific event detections and fail to detect most indoor objects due to lack of proper training. The present disclosure receives and pre-processes stream of input images specific to plurality of scenes related to indoor space from robot mounted camera. Pre-processed stream of input images is passed to a first trained model to obtain plurality of bounding boxes and masks pertaining to objects. An object property detector algorithm is run on masks to detect properties of objects. Classify signages comprised in masks as text signage by passing through optical character recognition or symbol by passing through second trained model. Convert output of optical character recognition and second trained model into facts and infer new facts using steam reasoning. Matching patterns comprised in form of an adaptable business logic with inferred new facts and trigger alerts, if pattern is matched.

18 Claims, 8 Drawing Sheets

(58) Field of Classification Search
CPC .. G06V 20/36; G06V 30/19173; G06V 10/82;
G06V 30/10; G06V 20/52
See application file for complete search history.

(56) References Cited

U.S. PATENT DOCUMENTS

2019/0228269 A1* 7/2019 Brent ..................... G06N 3/094
2020/0394413 A1* 12/2020 Bhanu .................... G06N 3/045
2023/0409749 A1* 12/2023 Li .......................... G06V 20/70

OTHER PUBLICATIONS

Di Paola et al., "An Autonomous Mobile Robotic System for Surveillance of Indoor Environments," International Journal of Advanced Robotic Systems, 7(1) (2010).
Lv et al., "Object Detection for Sweeping Robots in Home Scenes (ODSR-IHS): A Novel Benchmark Dataset," Digital Object Identifier (2021).
Madokoro et al., "Benchmark Dataset Based on Category Maps with Indoor-Outdoor Mixed Features for Positional Scene Recognition by a Mobile Robot," Robotics, (2020).
Singh et al., "Computer-Vision Based Object Detection and Recognition for Service Robot in Indoor Environment," Computers, Materials & Continua, 7(1) (2022).

* cited by examiner

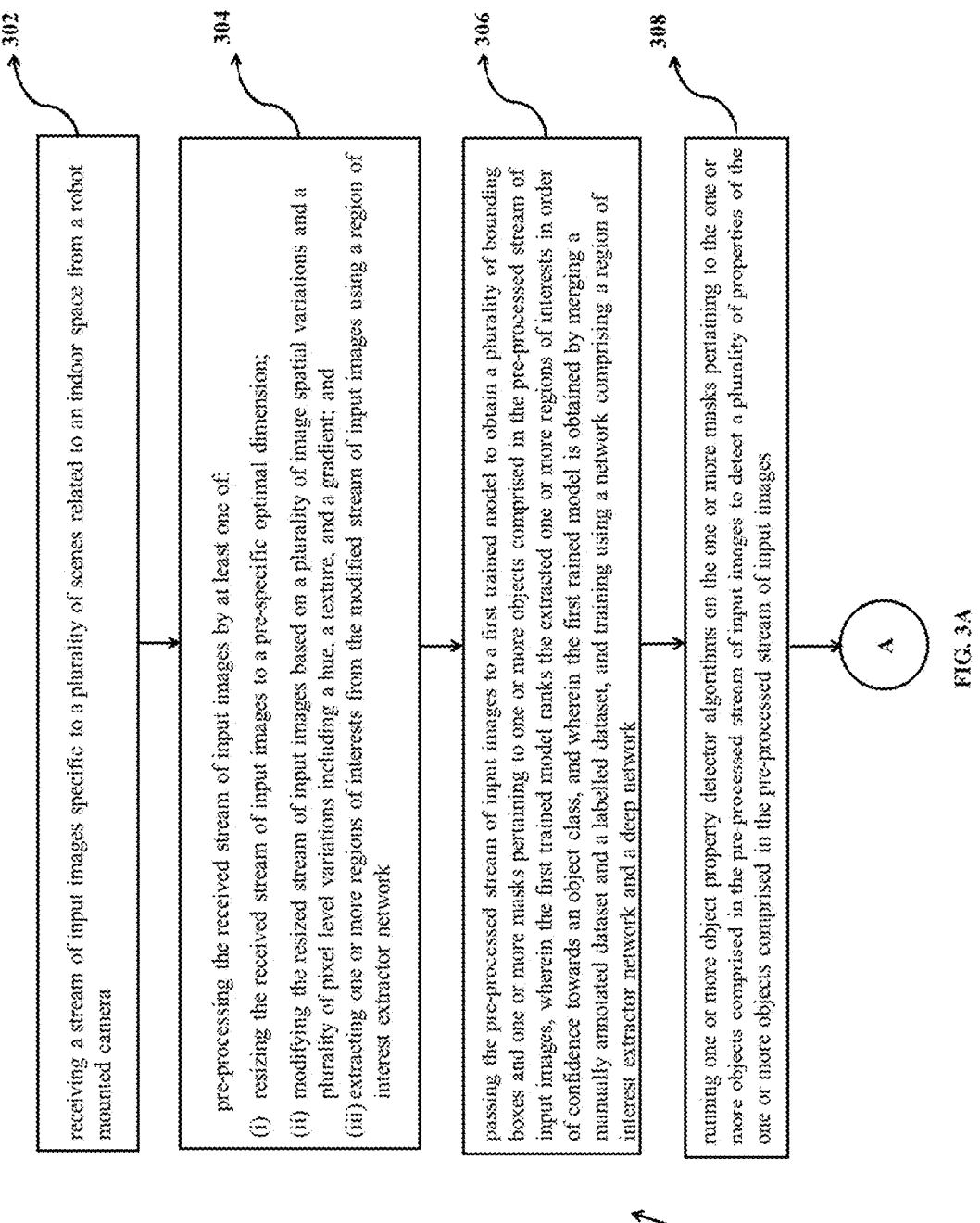

302 receiving a stream of input images specific to a plurality of scenes related to an indoor space from a robot mounted camera

304 pre-processing the received stream of input images by at least one of:

(i) resizing the received stream of input images to a pre-specific optimal dimension;

(ii) modifying the resized stream of input images based on a plurality of image spatial variations and a plurality of pixel level variations including a hue, a texture, and a gradient; and (iii) extracting one or more regions of interests from the modified stream of input images using a region of interest extractor network

306 passing the pre-processed stream of input images to a first trained model to obtain a plurality of bounding boxes and one or more masks pertaining to one or more objects comprised in the pre-processed stream of input images, wherein the first trained model ranks the extracted one or more regions of interests in order of confidence towards an object class, and wherein the first rained model is obtained by merging a manually annotated dataset and a labelled dataset, and training using a network comprising a region of interest extractor network and a deep network

308 running one or more object property detector algorithms on the one or more masks pertaining to the one or more objects comprised in the pre-processed stream of input images to detect a plurality of properties of the one or more objects comprised in the pre-processed stream of input images

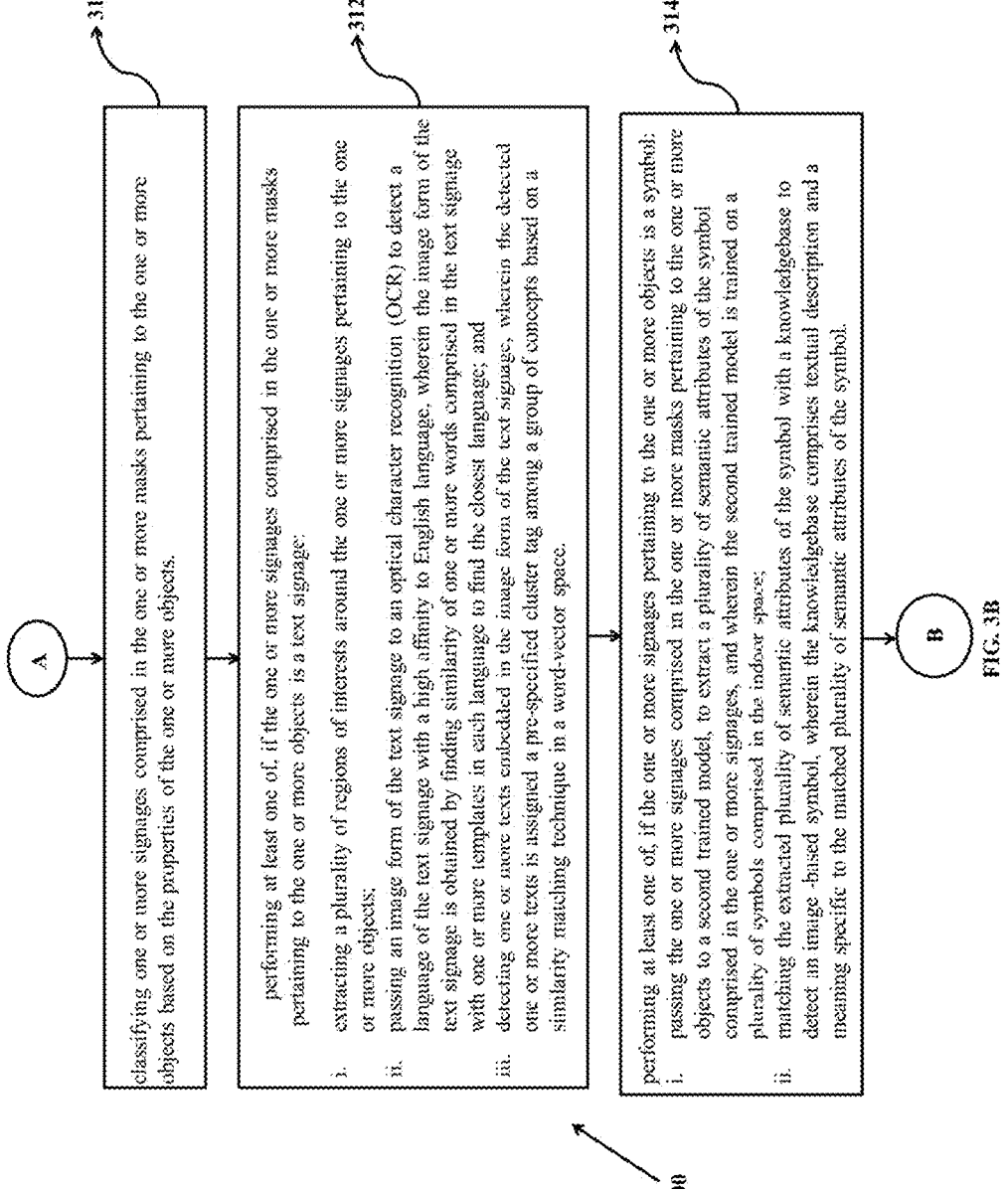

A

310 classifying one or more signages comprised in the one or more masks pertaining to the one or more objects based on the properties of the one or more objects.

312 performing at least one of, if the one or more signages comprised in the one or more masks pertaining to the one or more objects is a text signage:

i. extracting a plurality of regions of interests around the one or more signages pertaining to the one or more objects;

ii. passing an image form of the text signage to an optical character recognition (OCR) to detect a language of the text signage with a high affinity to English language, wherein the image form of the text signage is obtained by finding similarity of one or more words comprised in the text signage with one or more templates in each language to find the closest language; and iii. detecting one or more texts embedded in the image form of the text signage, wherein the detected one or more texts is assigned a pre-specified cluster tag among a group of concepts based on a similarity matching technique in a word-vector space.

314 performing at least one of, if the one or more signages pertaining to the one or more objects is a symbol:

i. passing the one or more signages comprised in the one or more masks pertaining to the one or more objects to a second trained model, to extract a plurality of semantic attributes of the symbol comprised in the one or more signages, and wherein the second trained model is trained on a plurality of symbols comprised in the indoor space;

ii. matching the extracted plurality of semantic attributes of the symbol with a knowledgebase to detect in image -based symbol, wherein the knowledgebase comprises textual description and a meaning specific to the matched plurality of semantic attributes of the symbol.

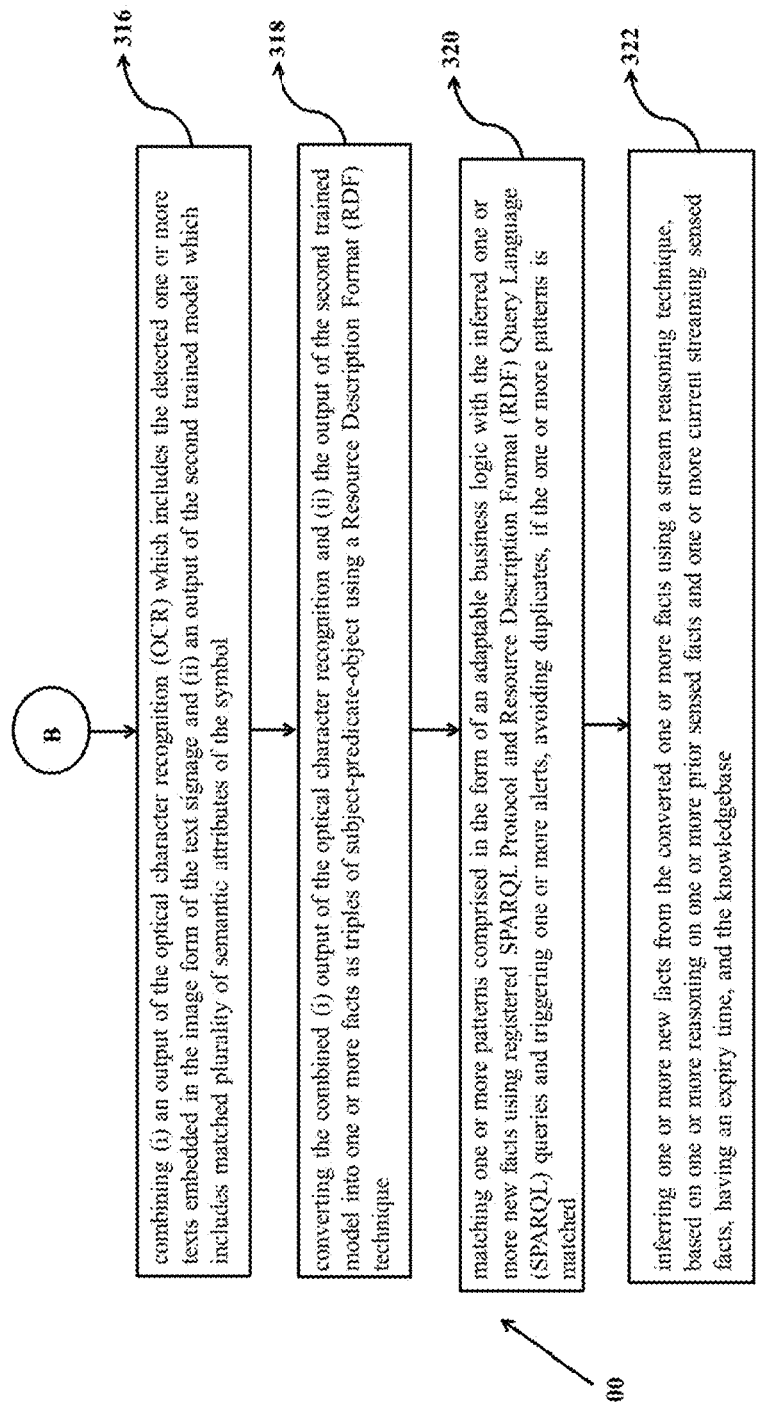

B combining (i) an output of the optical character recognition (OCR) which includes the detected one or more texts embedded in the image form of the text signage and (ii) an output of the second trained model which includes matched plurality of semantic attributes of the symbol

→ 316 converting the combined (i) output of the optical character recognition and (ii) the output of the second trained model into one or more facts as triples of subject-predicate-object using a Resource Description Format (RDF) technique

→ 318 matching one or more patterns comprised in the form of an adaptable business logic with the inferred one or more new facts using registered SPARQL Protocol and Resource Description Format (RDF) Query Language (SPARQL) queries and triggering one or more alerts, avoiding duplicates, if the one or more patterns is matched

→ 320 inferring one or more new facts from the converted one or more facts using a stream reasoning technique, based on one or more reasoning on one or more prior sensed facts and one or more current streaming sensed facts, having an expiry time, and the knowledgebase

SYSTEM AND METHOD FOR COGNITIVE SURVEILLANCE ROBOT FOR SECURING INDOOR SPACES

PRIORITY CLAIM

This U.S. patent application claims priority under 35 U.S.C. § 119 to: Indian Patent Application number 202321063075, filed on Sep. 20, 2023. The entire contents of the aforementioned application are incorporated herein by reference.

TECHNICAL FIELD

The disclosure herein generally relates to an indoor surveillance or a security robot, and, more particularly, to a system and method for cognitive surveillance robot for securing indoor spaces.

BACKGROUND

Surveillance and patrolling are the key functional tasks in protecting secure spaces by a mobile robot. What happens when an intruder enters a secured premise? What if there is water spillage and cluttered wires lying around in office spaces? What if there is an electric spark observed in a human restricted area? There exist many hazardous scenarios specific to building security and HSE (Health, Safety, and Environment) risks for indoor environments. In such scenarios, a row of static cameras with fixed view angles administered by security desk do not serve 24×7 monitoring compliance requirement.

Further, an office Identity Card (ID) card left unattended in an office space is a security violation. Similarly, water spillage and wires lying on floor is a safety hazard that may lead to persons tripping over. Hence, a mobile robot needs to make sense of the world it is in, based on camera observations and past knowledge to raise alerts. This requires inculcation of computational cognitive ability in a robotic system.

The existing works on the surveillance robots in indoor scenarios are limited as the existing works focus only on specific event detections including fire and incapable of detecting most indoor objects due to lack of proper training. The major scope of the existing work can be divided into the actual scene understanding from the robot's camera view and secondly the action taken (like movement and alerting channels). Some of the existing works have focused on detecting unusual patterns (anomalies) from robot camera feed, while other existing works has focused on raising alarms for fire incidents. While some of the existing works has developed simple solutions in simulation environment, some others have done limited deployment in real life settings. Also, there has been no dedicated work to create an object detection model for indoor scenarios, despite some of the recent works showing robust performance for outdoor scenes.

SUMMARY

Embodiments of the present disclosure present technological improvements as solutions to one or more of the above-mentioned technical problems recognized by the inventors in conventional systems. For example, in one embodiment, a method for cognitive surveillance robot for securing indoor spaces. The method includes receiving, via one or more hardware processors, a stream of input images specific to a plurality of scenes related to an indoor space from a robot mounted camera; pre-processing, via the one or more hardware processors, the received stream of input images by at least one of: (i) resizing the received stream of input images to a pre-specific optimal dimension; (ii) modifying the resized stream of input images based on a plurality of image spatial variations and a plurality of pixel level variations including a hue, a texture, and a gradient; and (iii) extracting one or more regions of interests from the modified stream of input images using a region of interest extractor network; passing, via the one or more hardware processors, the pre-processed stream of input images to a first trained model to obtain a plurality of bounding boxes and one or more masks pertaining to one or more objects comprised in the pre-processed stream of input images, wherein the first trained model ranks the extracted one or more regions of interests in order of confidence towards an object class, and wherein the first trained model is obtained by merging a manually annotated dataset and a labelled dataset, and training using a network comprising a region of interest extractor network and a deep network; running, via the one or more hardware processors, one or more object property detector algorithms on the one or more masks pertaining to the one or more objects comprised in the pre-processed stream of input images to detect a plurality of properties of the one or more objects comprised in the pre-processed stream of input images; classifying, via the one or more hardware processors, one or more signages comprised in the one or more masks pertaining to the one or more objects based on the properties of the one or more objects; performing, via the one or more hardware processors, at least one of, if the one or more signages comprised in the one or more masks pertaining to the one or more objects is a text signage: (i) extracting a plurality of regions of interests around the one or more signages pertaining to the one or more objects; (ii) passing an image form of the text signage to an optical character recognition (OCR) to detect a language of the text signage with a high affinity to English language, wherein the image form of the text signage is obtained by finding similarity of words comprised in the text signage with one or more templates in each language to find the closest language; and (iii) detecting one or more texts embedded in the image form of the text signage, wherein the detected one or more texts is assigned a pre-specified cluster tag among a group of concepts based on a similarity matching technique in a word-vector space; performing, via the one or more hardware processors, at least one of, if the one or more signages pertaining to the one or more objects is a symbol: (i) passing the one or more signages comprised in the one or more masks pertaining to the one or more objects to a second trained model, to extract a plurality of semantic attributes of the symbol comprised in the one or more signages, and wherein the second trained model is trained on a plurality of symbols comprised in the indoor space; and (ii) matching the extracted plurality of semantic attributes of the symbol with a knowledgebase to detect an image-based symbol, wherein the knowledgebase comprises textual description and a meaning specific to the matched plurality of semantic attributes of the symbol; combining, via the one or more hardware processors, (i) an output of the optical character recognition (OCR) which includes the detected one or more texts embedded in the image form of the text signage and (ii) an output of the second trained model which includes matched plurality of semantic attributes of the symbol; converting, via the one or more hardware processors, the combined (i) output of the optical character recognition (OCR) and (ii) the output of the second trained model into one or more facts as triples of subject-predicate-object using a Resource Description Format (RDF) technique; inferring, via the one or more hardware processors, one or more new facts from the converted one or more facts using a steam reasoning technique, based on one or more reasoning on one or more prior sensed facts and one or more current streaming sensed facts, having an expiry time, and the knowledgebase; and matching, via the one or more hardware processors, one or more patterns comprised in the form of an adaptable business logic with the one or more inferred new facts using registered one or more SPARQL Protocol and Resource Description Format (RDF) Query Language (SPARQL) queries and triggering one or more alerts, avoiding duplicates, if the one or more patterns are matched.

In another aspect, there is provided a system for cognitive surveillance robot for securing indoor spaces. The system comprises: a memory storing instructions; one or more communication interfaces; and one or more hardware processors coupled to the memory via the one or more communication interfaces, wherein the one or more hardware processors are configured by the instructions to: receive a stream of input images specific to a plurality of scenes related to an indoor space from a robot mounted camera. The system further comprises pre-processing, via the one or more hardware processors, the received stream of input images by at least one of: (i) resizing the received stream of input images to a pre-specific optimal dimension; (ii) modifying the resized stream of input images based on a plurality of image spatial variations and a plurality of pixel level variations including a hue, a texture, and a gradient; and (iii) extracting one or more regions of interests from the modified stream of input images using a region of interest extractor network; passing, via the one or more hardware processors, the pre-processed stream of input images to a first trained model to obtain a plurality of bounding boxes and one or more masks pertaining to one or more objects comprised in the pre-processed stream of input images, wherein the first trained model ranks the extracted one or more regions of interests in order of confidence towards an object class, and wherein the first trained model is obtained by merging a manually annotated dataset and a labelled dataset, and training using a network comprising a region of interest extractor network and a deep network; running, via the one or more hardware processors, one or more object property detector algorithms on the one or more masks pertaining to the one or more objects comprised in the pre-processed stream of input images to detect a plurality of properties of the one or more objects comprised in the pre-processed stream of input images; classifying, via the one or more hardware processors, one or more signages comprised in the one or more masks pertaining to the one or more objects based on the properties of the one or more objects; performing, via the one or more hardware processors, at least one of, if the one or more signages comprised in the one or more masks pertaining to the one or more objects is a text signage: (i) extracting a plurality of regions of interests around the one or more signages pertaining to the one or more objects; (ii) passing an image form of the text signage to an optical character recognition (OCR) to detect a language of the text signage with a high affinity to English language, wherein the image form of the text signage is obtained by finding similarity of words comprised in the text signage with one or more templates in each language to find the closest language; and (iii) detecting one or more texts embedded in the image form of the text signage, wherein the detected one or more texts is assigned a pre-specified cluster tag among a group of concepts based on a similarity matching technique in a word-vector space; performing, via the one or more hardware processors, at least one of, if the one or more signages pertaining to the one or more objects is a symbol: (i) passing the one or more signages comprised in the one or more masks pertaining to the one or more objects to a second trained model, to extract a plurality of semantic attributes of the symbol comprised in the one or more signages, and wherein the second trained model is trained on a plurality of symbols comprised in the indoor space; and (ii) matching the extracted plurality of semantic attributes of the symbol with a knowledgebase to detect an image-based symbol, wherein the knowledgebase comprises textual description and a meaning specific to the matched plurality of semantic attributes of the symbol; combining, via the one or more hardware processors, (i) an output of the optical character recognition (OCR) which includes the detected one or more texts embedded in the image form of the text signage and (ii) an output of the second trained model which includes matched plurality of semantic attributes of the symbol; converting, via the one or more hardware processors, the combined (i) output of the optical character recognition (OCR) and (ii) the output of the second trained model into one or more facts as triples of subject-predicate-object using a Resource Description Format (RDF) technique; inferring, via the one or more hardware processors, one or more new facts from the converted one or more facts using a steam reasoning technique, based on one or more reasoning on one or more prior sensed facts and one or more current streaming sensed facts, having an expiry time, and the knowledgebase; and matching, via the one or more hardware processors, one or more patterns comprised in the form of an adaptable business logic with the one or more inferred new facts using registered one or more SPARQL Protocol and Resource Description Format (RDF) Query Language (SPARQL) queries and triggering one or more alerts, avoiding duplicates, if the one or more patterns are matched.

In yet another aspect, there are provided one or more non-transitory machine-readable information storage mediums comprising one or more instructions which when executed by one or more hardware processors cause receiving, via one or more hardware processors, a stream of input images specific to a plurality of scenes related to an indoor space from a robot mounted camera; pre-processing, via the one or more hardware processors, the received stream of input images by at least one of: (i) resizing the received stream of input images to a pre-specific optimal dimension; (ii) modifying the resized stream of input images based on a plurality of image spatial variations and a plurality of pixel level variations including a hue, a texture, and a gradient; and (iii) extracting one or more regions of interests from the modified stream of input images using a region of interest extractor network; passing, via the one or more hardware processors, the pre-processed stream of input images to a first trained model to obtain a plurality of bounding boxes and one or more masks pertaining to one or more objects comprised in the pre-processed stream of input images, wherein the first trained model ranks the extracted one or more regions of interests in order of confidence towards an object class, and wherein the first trained model is obtained by merging a manually annotated dataset and a labelled dataset, and training using a network comprising a region of interest extractor network and a deep network; running, via the one or more hardware processors, one or more object property detector algorithms on the one or more masks pertaining to the one or more objects comprised in the pre-processed stream of input images to detect a plurality of properties of the one or more objects comprised in the pre-processed stream of input images; classifying, via the one or more hardware processors, one or more signages comprised in the one or more masks pertaining to the one or more objects based on the properties of the one or more objects; performing, via the one or more hardware processors, at least one of, if the one or more signages comprised in the one or more masks pertaining to the one or more objects is a text signage: (i) extracting a plurality of regions of interests around the one or more signages pertaining to the one or more objects; (ii) passing an image form of the text signage to an optical character recognition (OCR) to detect a language of the text signage with a high affinity to English language, wherein the image form of the text signage is obtained by finding similarity of words comprised in the text signage with one or more templates in each language to find the closest language; and (iii) detecting one or more texts embedded in the image form of the text signage, wherein the detected one or more texts is assigned a pre-specified cluster tag among a group of concepts based on a similarity matching technique in a word-vector space; performing, via the one or more hardware processors, at least one of, if the one or more signages pertaining to the one or more objects is a symbol: (i) passing the one or more signages comprised in the one or more masks pertaining to the one or more objects to a second trained model, to extract a plurality of semantic attributes of the symbol comprised in the one or more signages, and wherein the second trained model is trained on a plurality of symbols comprised in the indoor space; and (ii) matching the extracted plurality of semantic attributes of the symbol with a knowledgebase to detect an image-based symbol, wherein the knowledgebase comprises textual description and a meaning specific to the matched plurality of semantic attributes of the symbol; combining, via the one or more hardware processors, (i) an output of the optical character recognition (OCR) which includes the detected one or more texts embedded in the image form of the text signage and (ii) an output of the second trained model which includes matched plurality of semantic attributes of the symbol; converting, via the one or more hardware processors, the combined (i) output of the optical character recognition (OCR) and (ii) the output of the second trained model into one or more facts as triples of subject-predicate-object using a Resource Description Format (RDF) technique; inferring, via the one or more hardware processors, one or more new facts from the converted one or more facts using a steam reasoning technique, based on one or more reasoning on one or more prior sensed facts and one or more current streaming sensed facts, having an expiry time, and the knowledgebase; and matching, via the one or more hardware processors, one or more patterns comprised in the form of an adaptable business logic with the one or more inferred new facts using registered one or more SPARQL Protocol and Resource Description Format (RDF) Query Language (SPARQL) queries and triggering one or more alerts, avoiding duplicates, if the one or more patterns are matched.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A through 3C are flow diagrams illustrating the steps involved in the method for cognitive surveillance robot for securing indoor spaces, according to some embodiments of the present disclosure.

DETAILED DESCRIPTION

Figure 1:
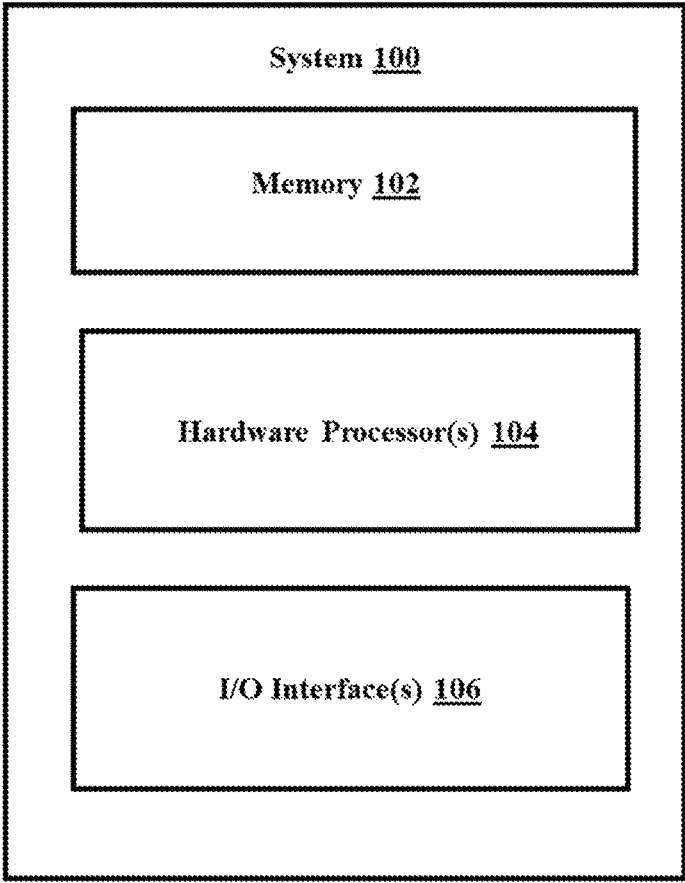
FIG. 1 illustrates an exemplary system for cognitive surveillance robot for securing indoor spaces, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure provides a system and method for cognitive surveillance robot for securing indoor spaces. In the present disclosure a hand annotated dataset involving one or more indoor objects, specific to one or more office spaces is created to understand the context of one or more perceived scenes. The present disclosure demonstrates an end-to-end cognitive pipeline to find real time security hazards based on a camera perception of a mobile robot to raise an appropriate one or more alerts to one or more stakeholders.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 illustrates an exemplary system for cognitive surveillance robot for securing indoor spaces, according to some embodiments of the present disclosure. In an embodiment, the system 100 includes one or more processors 104, communication interface device(s) or input/output (I/O) interface(s) 106, one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions.

Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
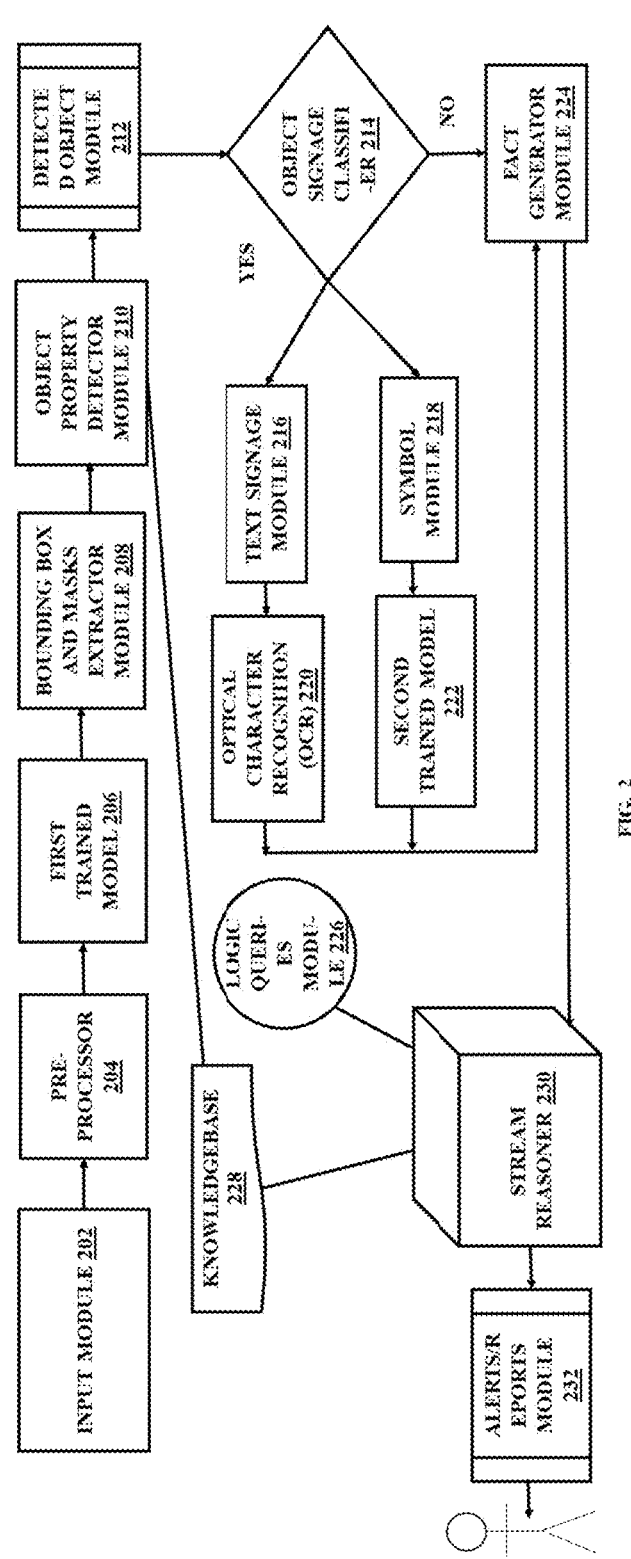
FIG. 2 is a functional block diagram of the system for cognitive surveillance robot for securing indoor spaces, according to some embodiments of the present disclosure.

FIG. 2, with reference to FIG. 1, illustrates a functional block diagram of the system for cognitive surveillance robot for securing indoor spaces, according to some embodiments of the present disclosure. In an embodiment, the system 200 includes an input module 202, a pre-processor 204, a first trained model 206, a bounding box and masks extractor module 208, an object property detector module 210, a detected object module 212, an object signage classifier 214, a text signage module 216, a symbol module 218, an optical character recognition 220, a second trained model 222, a fact generator module 224, a logic queries module 226, a knowledgebase 228, a stream reasoner 230, and an alerts/reports module 232.

FIGS. 3A through 3C are flow diagrams illustrating the steps involved in the method for cognitive surveillance robot for securing indoor spaces, according to some embodiments of the present disclosure. At step 302 of the method 300, the one or more hardware processors 104 receive a stream of input images specific to a plurality of scenes related to an indoor space from a robot mounted camera which is represented by the input module 202 of the system 200. The plurality of scenarios can include detecting wires lying on the ground, unwanted items including fruit peels and plastic wrappers on floor, regular lights turned on in unoccupied spaces, liquid spillage, fire safety equipment missing, lift or elevator areas getting over-crowded, unattended items including smartphone, mouse, keyboard, bag, notebook, and the like.

At step 304 of the method 300, the one or more hardware processors 104 pre-process the received stream of input images by resizing the stream of input images to a pre-specific optimal dimension. The re-sized stream of input images is modified based on a plurality of image spatial variations and a plurality of pixel level variations including a hue, a texture, and a gradient. Further one or more region of interests is extracted from the modified stream of input images using a region of interest extractor network as represented by the pre-processor module 204 of the system 200. In an embodiment of the present disclosure, the pre-specific optimal dimension is 640×640 as estimated through empirical experiments on different image dimensions. Furthermore, in an embodiment of the present disclosure, the region of interest extractor network includes either a deep network namely a region proposal network or an image signal processing network to identify portions of scene containing distinct information.

At step 306 of the method 300, the one or more hardware processors 104 pass the pre-processed stream of input images to a first trained model which is represented by the first trained model 206 of the system 200, to obtain a plurality of bounding boxes and one or more masks pertaining to one or more objects comprised in the pre-processed stream of input images. Further, the first trained model ranks the extracted one or more regions of interests in order of confidence towards an object class. Furthermore, the first trained model is obtained by merging a manually annotated dataset and a labelled dataset, and training using a network comprising the region of interest extractor network and the deep network which is represented by the bounding box and masks extractor module 208 of the system 200.

At step 308 of the method 300, the one or more hardware processors 104 run one or more object property detector algorithms on the one or more masks pertaining to the one or more objects comprised in the pre-processed stream of input images to detect a plurality of properties of the one or more objects comprised in the stream of input images which is represented by the object property detector module 210 of the system 200. The properties of the one or more objects detected (represented by the detected object module 212 of the system 200) includes a color, a texture, a shape, and semantic relationship of type of the one or more objects and the like.

At step 310 of the method 300, the one or more hardware processors 104 classify one or more signages comprised in the one or more masks pertaining to the one or more objects based on the properties of the one or more objects which is represented by the object signage classifier 214 of the system 200.

At step 312 of the method 300, the one or more hardware processors 104 perform one or more steps if the one or more signages comprised in the one or more masks pertaining to the one or more objects is a text signage which is represented by the text signage module 216 of the system 200. Further, a plurality of regions of interests around the one or more signages pertaining to the one or more objects are extracted. Further, an image form of the text signage is passed to an optical character recognition (OCR) to detect a language of the text signage with a high affinity to English language. The image form of the text signage is obtained by finding similarity of words comprised in the text signage with one or more templates in each language to find the closest language. Furthermore, one or more texts embedded in the image form of the text signage is detected and the detected one or more texts are assigned a pre-specified cluster tag among a group of concepts based on a similarity matching technique in a word-vector space which is represented by the optical character recognition (OCR) 220 of the system 200.

At step 314 of the method 300, the one or more hardware processors 104 perform one or more steps, if the one or more signages pertaining to the one or more objects is a symbol which is represented by the symbol module 218 of the system 200. Further the one or more signages comprised in the one or more masks pertaining to the one or more objects are passed to a second trained model, to extract a plurality of semantic attributes of the symbol comprised in the one or more signages. The second trained model which is represented by the second trained model 222 of the system 200, is trained on a plurality of different symbols comprised in the indoor space. Further, the extracted plurality of semantic attributes of the symbol are matched with a knowledgebase to detect an image-based symbol. The knowledgebase comprises textual description and a meaning specific to the matched plurality of semantic attributes of the symbol.

In an embodiment of the present disclosure, once the object signage is marked as detected, the object signage needs to be ascertained if the object is of type text sign or symbol or a combination of text sign and symbol. A second model which is represented by the second trained model of the system 200 is obtained by training on different symbols in indoor spaces (such as washroom, exit), where each of the symbol type serves as a class. The extracted mask from signage detection is passed to both EasyOCR (Optical Character recognition (known in the art)) and the symbol type detecting model to infer the output. The second trained model which comprises an off-the-shelf Optical Character recognition (OCR) model recognizes both the language type and the content of text. The off-the-shelf Optical Character recognition (OCR) model is loaded in memory similar to the first trained model and the second trained model. In case of the first trained model and the second trained model, the input is the extracted one or more region of interests comprised in the image containing the one or more objects and the output is a class. In case of the off-the-shelf Optical Character recognition (OCR), input is the extracted one or more regions of interests comprised in the image and output is a text, which is then mapped to one of the group of concepts around signage in ontology. The extracted text or symbol is compared (or matched) with the knowledgebase to understand the semantic attributes of the text or symbol. If the detection rate of the focus object is low, the robot is triggered to move closer to the object or zoom the robot's camera to get a better view which is done by feedback, taking into account how far the object is from the robot and a confidence score of the Optical Character recognition (OCR) and the second trained model. The confidence score is the probability of a class (of object) to be correctly classified. This is a scenario, where only a physical robot can investigate and traverse to an ambiguous object, which static surveillance cameras is incapable of.

In an alternate embodiment of the present disclosure, if the object is a combination of text sign and symbol, the first trained model is invoked for text processing and the second trained model is invoked for sign symbol detection wherein the extracted one or more region of interests comprised in the image contains both symbol and the text sign, which is written as mix or a combination of both.

At step 316 of the method 300, the one or more hardware processors 104 combine an output of the optical character recognition which includes the detected one or more text embedded in the image form of the text signage and an output of the second trained model which includes matched plurality of semantic attributes of the symbol. Herein, the plurality of semantic attributes of the symbol includes a semantic text mapped to a type of the symbol, a meaning of the symbol and a positional context in the environment. The positional context refers to a semantic location of the detected signage for e.g., "restricted" written on a meeting room region giving the scene a context of a restricted meeting room, not be entered by unauthorized persons.

At step 318 of the method 300, the one or more hardware processors 104 convert the combined (i) output of the optical character recognition and (ii) the output of the second trained model into one or more facts as triples of subject-predicate-object using a Resource Description Format (RDF) technique which is represented by the fact generator module 224 of the system 200. The logic queries module 226 of the system 200 is configured to the registered SPARQL Protocol and Resource Description Format (RDF) Query Language (SPARQL) queries and help in executing the SPARQL Protocol and Resource Description Format (RDF) Query Language (SPARQL) queries on the working memory of stream reasoner.

At step 320 of the method 300, the one or more hardware processors 104 infer one or more new facts from the converted one or more facts using a steam reasoning technique which is represented by the stream reasoner 230 of the system 200. The one or more new facts are inferred based on one or more reasoning on one or more prior sensed facts and one or more current streaming sensed facts, having an expiry time, and the knowledgebase which is represented by the knowledgebase 228 of the system 200.

At step 322 of the method 300, the one or more hardware processors 104 match one or more patterns comprised in the form of an adaptable business logic with the inferred new facts using registered SPARQL Protocol and Resource Description Format (RDF) Query Language (SPARQL) queries and triggering one or more alerts, avoiding duplicates, if the one or more patterns is matched which is represented by the knowledgebase 232 of the system 200. The one or more patterns can be in the form of a predicate matching in the SPARQL Protocol and Resource Description Format (RDF) Query Language (SPARQL) query format compliant with a semantic web technology.

In an embodiment of the present disclosure, the knowledgebase refers to a pre-populated fact database and an ontology. The group of concepts includes the knowledge of the environment, the robot, one or more types of hazards, one or more rules under which alert needs to be triggered, and is stored in the form of the ontology and file comprising one or more facts.

Figure 4:
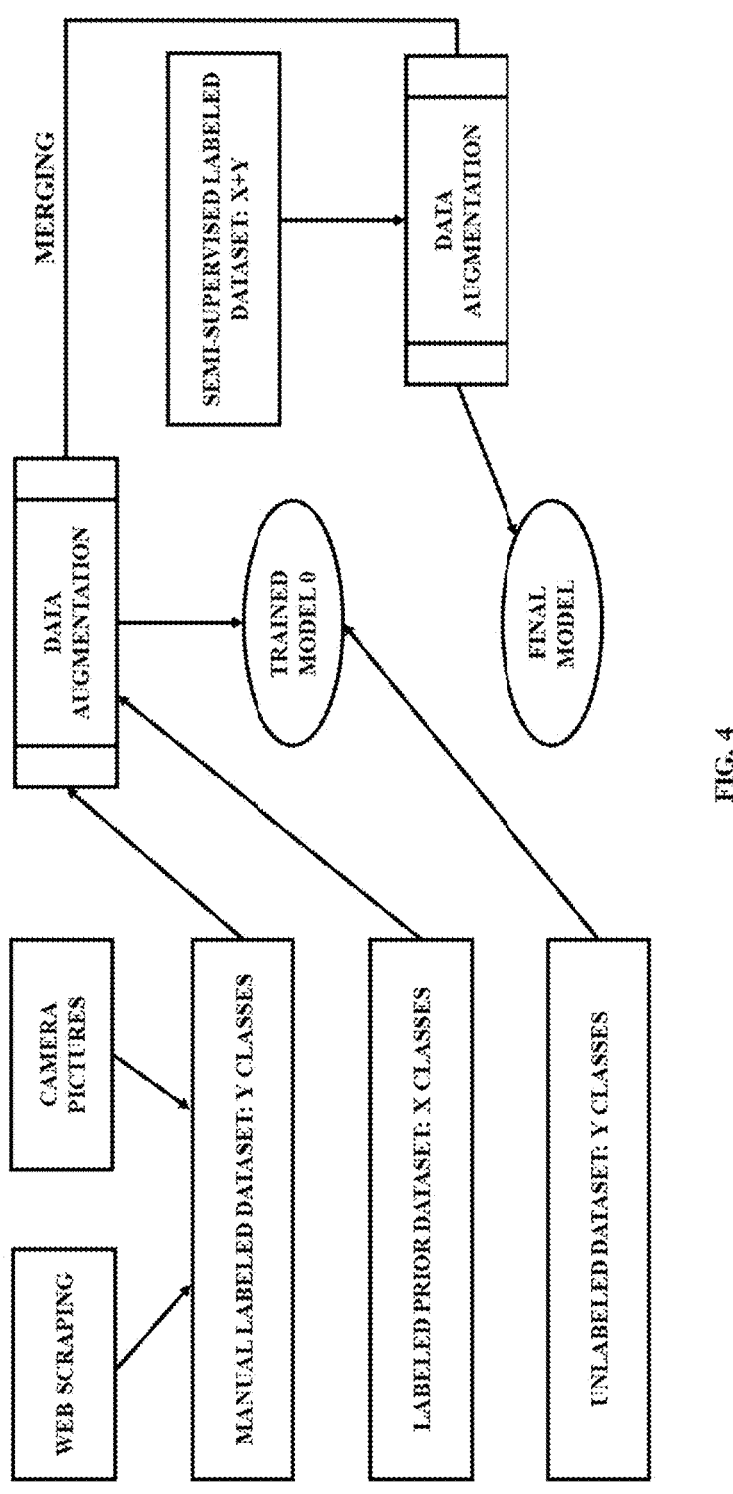
FIG. 4 is a block diagram illustrating a model training by merging labeled and unlabeled data in conjunction with the method for cognitive surveillance robot for securing indoor spaces, according to some embodiments of the present disclosure.

FIG. 4 is a block diagram illustrating a model training by merging labeled and unlabeled data in conjunction with the method for cognitive surveillance robot for securing indoor spaces, according to some embodiments of the present disclosure. In the present disclosure, web scrapped data and camera captured image sequences are collected to train the first trained model (which is represented by the first trained model 206 of the system 200), due to lack of indoor dataset, specific to one or more secure spaces including office. The first trained model is trained with 75 classes of objects and regions, wherein 75 classes comprise objects and regions, including a cubicle area. This can be easily extended to any number of objects and regions by gathering and annotating relevant data. The average number of pictures collected from the web scrapped data is around 200, and for camera shot pictures the average number of pictures is around 50. Initially, a section of data is annotated using an image annotation tool including a Visual Object Tagging Tool (VoTT) with the aforementioned 75 class labels of objects (including regions) with one image having multiple objects in an overlapping state. Instead of drawing bounding box, a polygonal shape is used in the present disclosure to assume actual coverage of the polygonal shape in an image similar to masking. Such number of 75 classes shall not be construed as limiting the scope of the present disclosure, as this can be extended to other classes on appropriate training. This labelled data of Y classes help to annotate other unlabeled collected data in the form of a guided bounding box generation learned using a fast object detector network including a You Look Only Once Object detector (YOLO) (known in the art) on past labelled data. So, in the next round of annotation of unlabeled data, predicted mask with bounding boxes are shown to the annotator, which are tweaked to make the coverage of the object class in the image (containing one or more objects) accurate. Once all the unlabeled data is labelled, an extensive data augmentation technique is used (as listed in Table 1 and Table 2) to make the dataset containing a plurality of annotated images, large and robust for training of the first trained model. Through ablation studies, it is found that a random spatial transform plays a major role in the data augmented generalization. This set of image dataset is merged with an already existing class of X objects (a subset of Common Objects in Context (COCO) dataset filtered for only indoor objects (known in art)) to get the final first trained model which is explained in later sections. Table 1 depicts pixel level data augmentation techniques used to expand the labeled indoor dataset for generalization. Table 2 depicts spatial level transforms used to augment the labeled indoor dataset for generalization.

TABLE 1

Pixel level data augmentation techniques used to expand
the labeled indoor dataset for generalization.

| | |
|---|---|
| Blur | Applies a blur effect to the image, reducing sharpness and details. |
| CLAHE | (Contrast Limited Adaptive Histogram Equalization) Enhances the contrast of the image by redistributing pixel intensities using adaptive histogram equalization. |
| Channel Dropout | Randomly drops one or more channels of the image, simulating missing color information. |
| ChannelShuffle | Shuffles the image color channels randomly, creating a different color arrangement. |
| ColorJitter | Randomly adjusts the brightness, contrast, saturation, and hue of the image. |
| Defocus | Simulates the defocusing effect by blurring the image to create a shallow depth of field. |
| Downscale | Reduces the size of the image by scaling it down, resulting in a lower resolution |
| Emboss | Applies an embossing effect, enhancing its 3-D appearance by emphasizing its edges. |
| Equalize | Performs histogram equalization, redistributing pixel intensities to improve contrast. |
| FDA | (Flipped, Translated, and Rotated Data Augmentation) Generates augmented images by randomly flipping, translating, and rotating the original image. |
| FancyPCA | Applies a principal component analysis (PCA) on the image, altering its color distribution. |
| FromFloat | Converts the image from float format to the standard image format. |
| GaussNoise | Adds Gaussian noise to the image, simulating random variations in pixel values. |
| GaussianBlur | Blurs the image using a Gaussian filter, reducing high-frequency noise and details. |
| GlassBlur | Simulates the effect of glass blur by distorting and blurring the image. |
| HueSaturationValue | Randomly adjusts the hue, saturation, and value (brightness) of the image. |
| ISONoise | Simulates noise generated by digital camera sensors, adding random variations to pixel values. |
| ImageCompression | Applies compression artifacts, mimicking the degradation by image compression algorithms. |
| InvertImg | Inverts the colors of the image, creating a negative effect. |
| MedianBlur | Blurs the image, replacing each pixel's value with the median value of its neighborhood. |
| MotionBlur | Blurring the image along a specific direction, mimicking the effect of a moving object. |
| MultiplicativeNoise | Adds multiplicative noise to the image, causing random scaling of pixel values. |
| Normalize | Normalizes the pixel values of the image to a specific range, typically between 0 and 1. |
| Posterize | Reduces the number of bits used to represent the colors in the image, creating a poster-like effect. |
| RGBShift | Shifts the values of the RGB channels of the image independently, introducing color offsets. |
| RandomBrightnessContrast | Randomly adjusts the brightness and contrast of the image. |
| RandomFog | Adds a foggy effect to the image, reducing its visibility and introducing a haze-like appearance. |
| RandomGamma | Applies a random gamma correction to the image, altering its overall brightness and contrast. |
| RandomGravel | Adds random gravel-like patterns to the image, simulating textured surfaces. |
| RandomRain | Superimposes randomly generated raindrops on the image, creating a rainy effect. |
| RandomShadow hline RandomSnow | Applies random shadows to the image, giving the impression of objects casting shadows. Superimposes randomly generated snowflakes on the image, creating a snowy effect. |

TABLE 1-continued

| Pixel level data augmentation techniques used to expand the labeled indoor dataset for generalization. | |
| --- | --- |
| RandomSunFlare | Adds random sun flare effects to the image, simulating the presence of bright sunlight. |
| RandomToneCurve | Applies a random tone curve transformation to the image, altering its tonal distribution. |
| RingingOvershoot | Adds ringing overshoot artifacts to the image, creating a distorted appearance. |
| Sharpen | Enhances the sharpness of the image by increasing the contrast along edges. |
| Solarize | Inverts the pixel values above a threshold, creating a solarization effect. |
| Spatter | Simulates paint splatter on the image, adding random blotches and speckles. |
| Superpixels | Divides the image into regions called superpixels, which can be useful for tasks such as segmentation. |
| TemplateTransform | Applies a template-based transformation to the image, warping and distorting it. |
| ToGray | Converts the image to grayscale, discarding the color information. |
| ToSepia | Applies a sepia tone effect to the image, giving it an aged appearance. |
| UnsharpMask | Enhances the edges of the image by subtracting a blurred version of the image from the original. |
| ZoomBlur | Applies a zooming blur effect to the image, creating a radial blurring pattern. |

TABLE 2

| Spatial Level transforms used to augment the labeled indoor dataset for generalization. | |
| --- | --- |
| Affine | Applies an affine transformation to the image, including rotation, translation, scaling, and shearing. |
| BBoxSafeRandomCrop | Randomly crops the image while ensuring that any bounding boxes present in the image remain intact. |
| CenterCrop | Crops the image around its center, preserving the central region. |
| CoarseDropout | Randomly masks out rectangular regions in the image, creating a dropout effect. |
| Crop | Crops the image to a specified size or aspect ratio. |
| CropAndPad | Crops or pads the image to a specified size. |
| CropNonEmptyMaskIfExists | Crops the image based on the non-empty region of a mask if it exists. |
| ElasticTransform | Applies elastic deformation to the image, simulating elastic distortions. |
| Flip | Flips the image horizontally and/or vertically |
| GridDistortion | Warps the image using a grid-based distortion effect. |
| GridDropout | Randomly masks out grid cells in the image, creating a dropout effect. |
| HorizontalFlip | Flips the image horizontally. |
| Lambda | Applies a custom lambda function to the image, allowing for custom transformations. |
| LongestMaxSize | Resizes the image while maintaining its aspect ratio, ensuring the longest side is of a specified size. |
| MaskDropout | Masks out regions in the image based on a binary mask. |
| NoOp | No operation; leaves the image unchanged. |
| OpticalDistortion | Simulates optical distortions, such as barrel or pincushion distortion. |
| PadIfNeeded | Pads the image to a specified size if it is smaller than the desired size. |
| Perspective | Applies perspective transformations to the image, simulating changes in viewpoint. |
| PiecewiseAffine | Warps the image using a piecewise affine transformation. |
| PixelDropout | Randomly masks out individual pixels in the image, creating a dropout effect. |

TABLE 2-continued

| Spatial Level transforms used to augment the labeled indoor dataset for generalization. | |
| --- | --- |
| RandomCrop | Randomly crops the image to a specified size or aspect ratio. |
| RandomCropFromBorders | Randomly crops the image from its borders. |
| RandomCropNearBBox | Randomly crops the image near a specified bounding box. |
| RandomGridShuffle | Randomly shuffles grid cells in the image. |
| RandomResizedCrop | Randomly crops and resizes the image to a specified size or aspect ratio. |
| RandomScale | Randomly scales the image by a specified factor |
| RandomSizedBBoxSafeCrop | Randomly crops the image ensuring that any bounding boxes present in the image remain intact. |
| RandomSizedCrop | Randomly crops the image with variable crop sizes. |
| Resize | Resizes the image to a specified size. |
| SafeRotate | Rotates the image while ensuring that the entire rotated image fits within the original image boundaries. |
| ShiftScaleRotate | Randomly applies rotation, translation, and scaling to the image. |
| SmallestMaxSize | Resizes the image while maintaining its aspect ratio, ensuring the smallest side is of a specified size. |
| VerticalFlip | Flips the image vertically. |

In an example embodiment of the present disclosure, the list of 75 object classes includes an Air Conditioner (AC), an artwork, a bag, a book, a box, a calendar, a camera, a Closed Circuit Television (CCTV), a chair, a clock, a coffee machine, a conference table, a Central Processing Unit (CPU), a cubicle area, a cup, a desktop, door, a door access control, a drawer, an electric point, an eyeglass, a fire alarm, a fire exit door, a fire extinguisher, a fire sensor, a flowerpot, a glass, a hard drive, a headphone, an id card, a keyboard, a laptop, a lift, a light source, a lunch bag, a lunch box, a marker, a mini pc, a mobile, a mouse, a notice board, a paper, a pen, a pen stand, a person, a poster, a power cable, a printer, a projector, a projector screen, a Quick Response (QR) code, a router, a sanitizer dispenser, a shredder, a signage, a spoon, a sprinkler, a sticky note, a symbol, a table lamp, a tablet, a telephone, a text, a toaster, a trash can, a trophy, a Television (TV), an umbrella, a Universal Serial Bus (USB) drive, a virtual reality viewer, a watch, a water bottle, a water dispenser, a water spillage, a white board and the like.

In a near real time robotic system, processing speed of incoming images plays a major role. As an example, an electric spark is momentary, but needs to be captured and investigated by the robot. So, dropping frames to balance processing speed is not an option for security robot. An important aspect is the size of image to be handled, so that the latency of processing is minimal to enable real time alerts. Based on the ablation results presented in Table 3, in an embodiment of the present disclosure, an image dimension of 640 by 640 pixels is selected for model inference, as under this setting, the time latency is less, an object detection confidence is relatively high, and number of objects detected per scene is acceptable. Further, image resizing is done via two approaches: (a) resizing the image without maintaining the aspect ratio, using interpolation techniques (b) resizing the image while maintaining the aspect ratio, using padding. Existing technique Segment Anything (known in the art) is compared with YOLOv8 (You Look Only Once Object detector ((known in the art)) and realized that the You Look Only Once Object detector (YOLO) performs better for real time settings. The dataset containing a plurality of annotated images, or a plurality of labelled images was trained using 5 cross-folds of 80% Train—10% Eval—10% Test on the entire dataset. On deployment and feedback, it is found that are specific classes like a 'shredder', a 'sprinkler' and AC (central air conditioning vents) that are incorrectly detected. Hence more data is collected around them (namely a 'shredder', a 'sprinkler' and AC) and the neural network comprised for the first trained model is tuned to give higher weightage to the low performing classes. Similar thing is done for second trained model for weakly detected symbol classes. Due to real time requirements, a bundle of weak classifiers is not used, and chose to stick to a single object detector model. Another aspect is handling persons as objects. Once one or more person is detected, it is checked by matching with a database of authorized one or more persons whether the one or more persons is legitimate to be in an area. One or more administrators of building needs to gather the identity data of authorized personnel, including face pictures on which one or more models (including the first trained model and the second trained model) is trained to identify who is the person and if (s)he is authorized in that region of space and further the one or more models (including the first trained model and the second trained model) is trained to classify one or more persons as authorized or not. Similarly, when the one or more persons are detected, they may participate in unusual activity. The one or more models (including the first trained model and the second trained model) is maintained following the principles of an existing work (Halder, M., Banerjee, S., and Purushothaman, B. Anomalous activity detection from ego view camera of surveillance robots (known in art).) to detect such anomalous activity scenarios including staff gathering around in a specific area and arguing, performing inappropriate behavior, littering around and the like. Table 3 depicts a comparison of system performance based on dimension of image processed post capture from robot camera.

TABLE 3

| | | Comparison of system performance based on dimension of image processed post capture from robot camera. | | | | |
|---|---|---|---|---|---|---|
| Image Dimension | Pre-processing Time | Inference | Post-processing | Total Time | Prediction Confidence | Objects detected |
| 1280 × 1280 | 5.1 milli-seconds (ms) | 70.6 ms | 1.6 ms | 77.3 ms | 0.346 | 2.36 |
| 640 × 640 | 2.1 ms | 18.2 ms | 1.64 ms | 21.98 ms | 0.49 | 2.02 |
| 320 × 320 | 0.65 ms | 9.75 ms | 1.15 ms | 11.6 ms | 0.454 | 1.67 |
| 32 × 32 | 0.43 ms | 14.2 ms | 1.05 ms | 15.7 ms | 0.018 | 0.04 |

Figure 5:
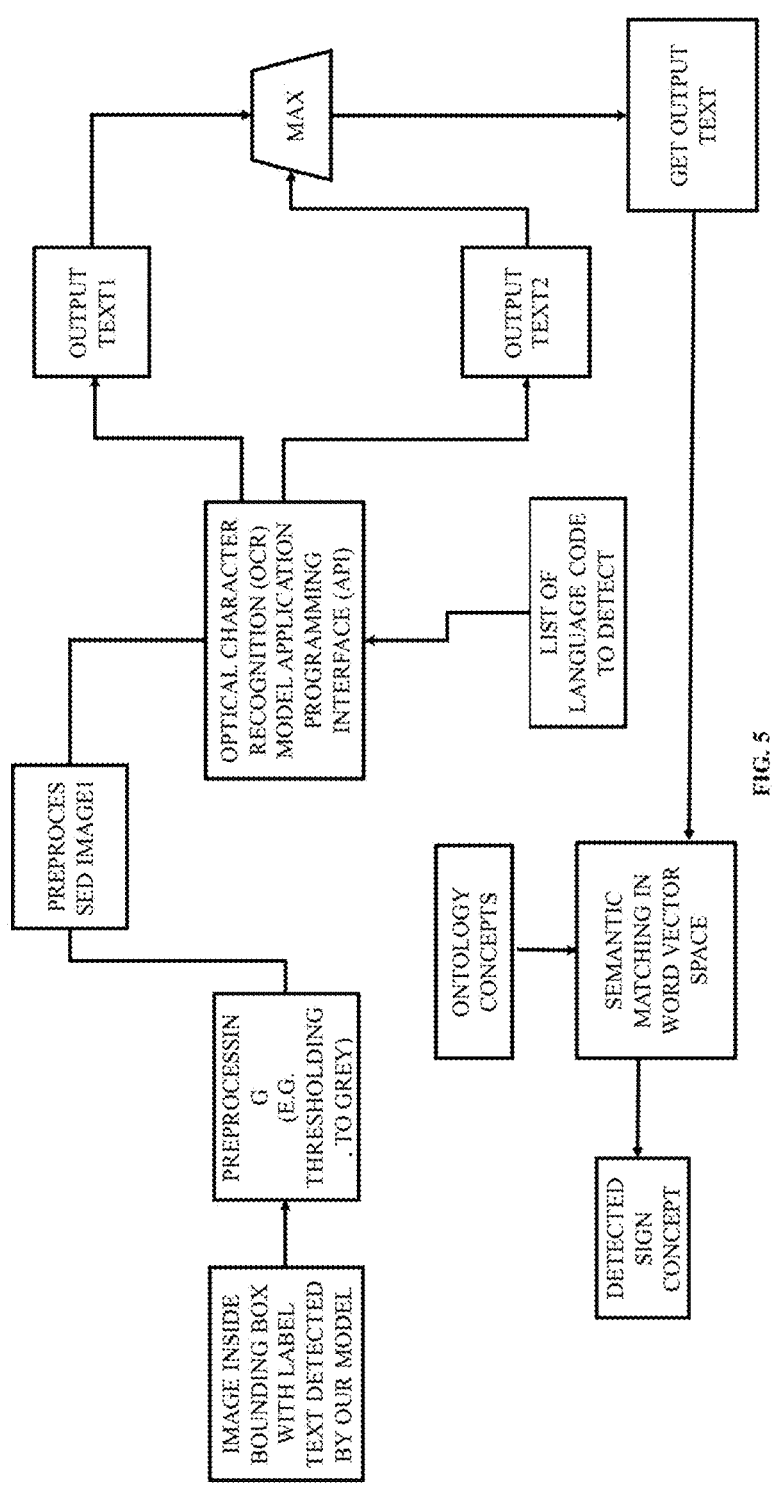
FIG. 5 is a block diagram for diagram illustrating a text recognition pipeline using an optical character recognition in conjunction with the method for cognitive surveillance robot for securing indoor spaces, according to some embodiments of the present disclosure.

FIG. 5 is a block diagram for diagram illustrating a text recognition pipeline using an optical character recognition (OCR) in conjunction with the method for cognitive surveillance robot for securing indoor spaces, according to some embodiments of the present disclosure. The image comprised in the extracted one or more masks after detection as 'signage' object is passed through a pre-processing block to make the image into an optimal image for Optical Character recognition (OCR) processing. The Optical Character recognition (OCR) initially detects the language of text, if there is text or terminates if no text found. If text is found, then image is passed to the corresponding Optical Character recognition (OCR) for that language and a set of probable output texts along with a score is outputted. The text having the maximum confidence is outputted and matched with an ontology concept to tag the Optical Character recognition (OCR) output to one of the concepts with respect to the highest score on a similarity matching of concept with text in word vector space.

Figure 6:
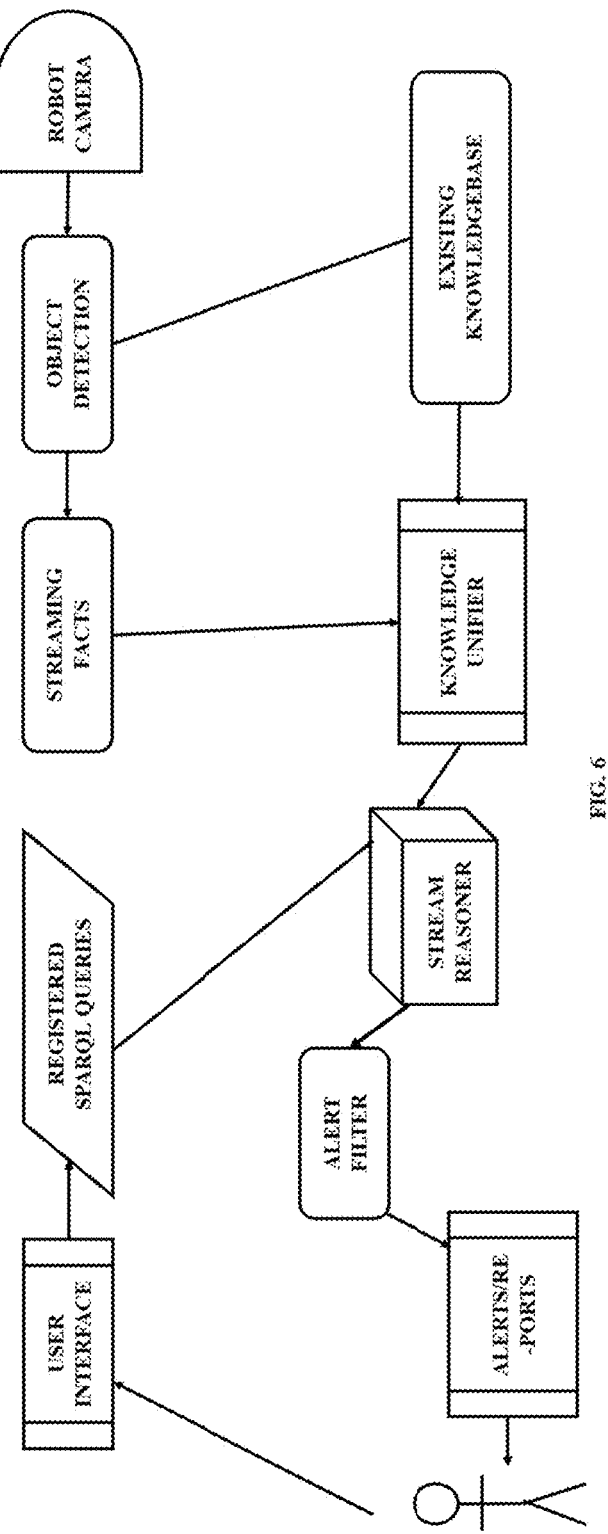
FIG. 6 is a block diagram for diagram illustrating a stream reasoner triggering alerts based on an input scene in conjunction with the method for cognitive surveillance robot for securing indoor spaces, according to some embodiments of the present disclosure.

FIG. 6 is a block diagram for diagram illustrating a stream reasoner triggering alerts based on an input scene in conjunction with the method for cognitive surveillance robot for securing indoor spaces, according to some embodiments of the present disclosure. In an embodiment of the present disclosure, it is important to store the information of when to trigger one or more alerts in form of a knowledge structure so that prior semantic information and sensed information can collide to give new patterns matching the conditions of the one or more alerts. In this respect, the present disclosure has adopted a semantic web technology for knowledge representation. The detected object or signage information (sensed by camera) is converted into fact format as triples of subject-predicate-object using a Resource Description Format (RDF) technique (known in art). Some custom defined prefix namespaces are used for the converted facts, for e.g., 'r' for robot, 'env' for environment, 'o' for object. An example of prior known fact like commonsense knowledge is:

[<o:Chair><o:hasProximity><o:Table>]

An example of sensed and generated fact is:

[<r:robot><r:hasLocation><env:Room1>]

In an embodiment of the present disclosure, the converted one or more facts are passed to stream reasoner as shown in FIG. 6, where reasoning happens on the fly on the one or more streaming facts (facts extracted from observed scenes) and background knowledgebase (existing and prior information) to infer one or more new facts. The stream reasoner is loosely based on the architecture of an existing work (Banerjee, S., Mukherjee, D., and Misra, P. 'what affects me?' a smart public alert system based on stream reasoning. I) that was used to generate public safety alerts reading online text feeds. Based on the logic of the use case and context, SPARQL Protocol and Resource Description Format (RDF) Query Language (SPARQL) queries were registered in the stream reasoner which runs at various intervals to match one or more patterns and trigger one or more alerts if the one or more patterns is matched. The one or more alerts includes fire, unauthorized access, security and health hazards. The one or more patterns includes patterns of alert type registered in form of SPARQL Protocol and Resource Description Format (RDF) Query Language (SPARQL) query is matched with the current context sensed (passed on as streaming facts) merged with existing knowledgebase. The stakeholders including the one or more administrators can register and modify the query logic of SPARQL Protocol and Resource Description Format (RDF) Query Language (SPARQL) queries by a user interface (UI). Example scenarios when the one or more patterns need to be detected are unauthorized one or more persons in a restricted area, fire safety hazards, water spillage on floor, identifying places of clutter. Logic of the one or more alerts can be written as one or more rules or one or more queries. However, as the one or more rules tend to generate more fact triples consuming memory and needs to be deleted at time intervals once they are invalid, embed logic in queries are adopted in the present disclosure. The adoption of embedded logic in queries gives an additional facility to turn off registered one or more queries, update the one or more queries on the fly and add new queries when the use case logic changes. An example SPARQL Protocol and Resource Description Format (RDF) Query Language (SPARQL) query is shown below to detect water spillage and alert the stakeholder with the situation and the location:

select?userToAlert?situation?place
from StreamingFacts, KnowledgeBase where
{<r:robot1><r:hasDetected>?situation.
?situation <rdf:type><env:WaterSpillage>
?userToAlert?<user: NeedsAlert>? situation.
?situation <r:hasLocation>?place}

As shown in FIG. 6, a scene graph (objects and their relationships in perceived scene) is generated post object detection and converted into the one or more streaming facts. The knowledgebase contains one or more prior known facts and relationships between the one or more objects with other objects and the scene graph with alert scenarios (the one or more alerts) in form of Web Ontology Language (OWL) ontology, compliant to the robotic standard ontology (known in the art). A sample relation of this ontology is:

<ObjectPropertyRange>
<ObjectProperty IRI="#isColocatedWith"/>
<Class IRI="env #IndoorObject"/>
</ObjectPropertyRange>

In an embodiment of the present disclosure, a knowledge unifier depicted in the FIG. 6 serves the purpose of bringing a plurality of static facts (including common properties of objects) and dynamic sensor detected facts (including the one or more objects in scene coming from camera image) in same semantic web compliant format. Further the inferencing cannot happen without the knowledge of whether static or dynamic (sensed) needs to be in a same format (here triple) for this to be queried by SPARQL Protocol and Resource Description Format (RDF) Query Language (SPARQL). The knowledge unifier is important as sometimes one or more streaming facts come from other sensors situated in the environment that uses some other form of database to store information. These one or more streaming facts, when inserted has an expiry time window attached to it so that when the robot moves, the one or more streaming facts becomes invalid and removed from the working memory. A window is needed to understand the context of the scene over observations. The present disclosure uses a time window of 5 seconds. The stream reasoner has a working memory that gathers one or more prior sensed facts from the knowledgebase (more specifically prior facts and class relationships) and merges the one or more prior sensed facts with one or more streaming facts post knowledge unification. An alert filter (shown in FIG. 6) is kept to avoid duplicate messages to intended recipients, and a situation fact is removed once an issue is detected as resolved in terms of no alerting inferences for some time that uses that pattern of triples. The situation fact is the fact with timestamp that expires and gets removed from working memory. An example of the situation fact includes an electric spark that resides for only a second, and post alerting, the situation fact is removed from working memory. The alert risk levels can also be set in terms of priority. For example, fire outbreak is high security hazard needing immediate attention-hence even if there is sensor error, the alert is conveyed. On the other hand, clutter is a low priority risk, and the robot will move around to new view angles to inspect whether the detection is correct, and then only transfer the alert to the relevant stakeholders defined in the knowledgebase for that alert category.

In an example embodiment of the present disclosure, the system 100 of the present disclosure is deployed as a software layer on top of a mobile robot in an office setup. The software layer contained the logic with controls over camera action and wheel movements. Three different scenes captured from robot's camera are considered herein. In this first scene, the robot's camera detects a cubicle area and a chair when the robot moves around to see if there is a chair for each cubicle. It is observed that often people take chair to meeting room without returning it or take it to some other cubicle. This results in a situation where a person allotted to the cubicle is unable to sit. To mitigate this, the robot patrols the office space to check if things are in order. This knowledge is declared in the ontology file as cubicle should have one chair, whereas meeting rooms and manager cabins can have multiple chairs. Consider the second scene, where the robot detects a poster on the door of an access-controlled area. Posters have a separate place to be hanged and should not be pasted anywhere without permission. So, in this case, the robot alerts the administrator to remove the poster and make the door clutter free. Consider the third scene, where the robot is shown from a third-party camera along with the robot's camera view. The robot checks whether the person detected is among the list of persons authorized to be in that area, else triggers the one or more alerts. The other alert triggering scenarios includes detecting wires lying on the ground, unwanted items including fruit peels and plastic wrappers on floor, regular lights turned on in unoccupied spaces, liquid spillage, fire safety equipment missing, lift or elevator areas getting over-crowded, unattended items including smartphone, mouse, keyboard, bag, notebook, and the like.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of surveillance robots in indoor scenarios using object detection model and stream reasoning. The embodiments thus provide a system and method for surveillance robot for office spaces that embeds flexible cognitive logic in terms of stream reasoning based continuous queries. The embodiments of present disclosure create an indoor annotated dataset specific to office spaces for training the models (the first trained model and the second trained model of the system 200).

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, via one or more hardware processors, a stream of input images specific to a plurality of scenes related to an indoor space from a robot mounted camera;

pre-processing, via the one or more hardware processors, the received stream of input images by:

(i) resizing the received stream of input images to a pre-specific optimal dimension;

(ii) modifying the resized stream of input images based on a plurality of image spatial variations and a plurality of pixel level variations including a hue, a texture, and a gradient; and (iii) extracting one or more regions of interests from the modified stream of input images using a region of interest extractor network;

passing, via the one or more hardware processors, the pre-processed stream of input images to a first trained model to obtain a plurality of bounding boxes and one or more masks pertaining to one or more objects comprised in the pre-processed stream of input images, wherein the first trained model ranks the extracted one or more regions of interests in order of confidence towards an object class, and wherein the first trained model is obtained by merging a manually annotated dataset and a labelled dataset, and training using a network comprising a region of interest extractor network and a deep network;

running, via the one or more hardware processors, one or more object property detector algorithms on the one or more masks pertaining to the one or more objects comprised in the pre-processed stream of input images to detect a plurality of properties of the one or more objects comprised in the pre-processed stream of input images;

classifying, via the one or more hardware processors, one or more signages comprised in the one or more masks pertaining to the one or more objects based on the properties of the one or more objects;

performing, via the one or more hardware processors:

(i) extracting a plurality of regions of interests around the one or more signages pertaining to the one or more objects;

(ii) passing an image form of a text signage to an optical character recognition (OCR) to detect a language of the text signage with a high affinity to English language, wherein the image form of the text signage is obtained by finding similarity of words comprised in the text signage with one or more templates in each language to find the closest language;

(iii) detecting one or more texts embedded in the image form of the text signage, wherein the detected one or more texts is assigned a pre-specified cluster tag among a group of concepts based on a similarity matching technique in a word-vector space;

(iv) passing the one or more signages comprised in the one or more masks pertaining to the one or more objects to a second trained model, to extract a plurality of semantic attributes of a symbol comprised in the one or more signages, and wherein the second trained model is trained on a plurality of symbols comprised in the indoor space; and (v) matching the extracted plurality of semantic attributes of the symbol with a knowledgebase to detect an image-based symbol, wherein the knowledgebase comprises textual description and a meaning specific to the matched plurality of semantic attributes of the symbol;

combining, via the one or more hardware processors, (i) an output of the optical character recognition (OCR) which includes the detected one or more texts embedded in the image form of the text signage and (ii) an output of the second trained model which includes matched plurality of semantic attributes of the symbol;

converting, via the one or more hardware processors, the combined (i) output of the optical character recognition (OCR) and (ii) the output of the second trained model into one or more facts as triples of subject-predicate-object using a Resource Description Format (RDF) technique;

inferring, via the one or more hardware processors, one or more new facts from the converted one or more facts using a steam reasoning technique, based on one or more reasoning on one or more prior sensed facts and one or more current streaming sensed facts, having an expiry time, and the knowledgebase; and matching, via the one or more hardware processors, one or more patterns comprised in the form of an adaptable business logic with the one or more inferred new facts using registered one or more SPARQL Protocol and Resource Description Format (RDF) Query Language (SPARQL) queries, and triggering one or more alerts as the robot moves around to new view angles to inspect correctness of the one or more inferred new facts, and then transfer the alert, avoiding duplicates.

2. The processor implemented method of claim 1, wherein the plurality of scenes includes one or more wires lying on the ground, one or more unwanted items including fruit peels and plastic wrappers on floor, one or more regular lights turned on in one or more unoccupied spaces, a liquid spillage, a fire safety equipment missing, a lift or an elevator areas getting over-crowded, one or more unattended items including a smartphone, a mouse, a keyboard, a bag and a notebook.

3. The processor implemented method of claim 1, wherein the plurality of properties of the one or more objects includes a color, a texture, a shape, and a semantic relationship of type of the one or more objects.

4. The processor implemented method of claim 1, wherein the knowledgebase is a pre-populated fact database and an ontology.

5. The processor implemented method of claim 1, wherein the group of concepts includes the knowledge of an environment, the robot, one or more types of hazards, one or more rules under which the one or more alerts needs to be triggered and stored in the form of the ontology and a file comprising one or more facts.

6. The processor implemented method of claim 1, wherein the plurality of semantic attributes of the symbol includes a semantic text mapped to a type of the symbol, a meaning of the symbol and a positional context in the environment.

7. A system, comprising:

a memory storing instructions;

one or more communication interfaces; and one or more hardware processors coupled to the memory via the one or more communication interfaces, wherein the one or more hardware processors are configured by the instructions to:

receive a stream of input images specific to a plurality of scenes related to an indoor space from a robot mounted camera;

pre-process the received stream of input images by:

(i) resizing the received stream of input images to a pre-specific optimal dimension;

(ii) modifying the resized stream of input images based on a plurality of image spatial variations and a plurality of pixel level variations including a hue, a texture, and a gradient; and (iii) extracting one or more regions of interests from the modified stream of input images using a region of interest extractor network;

pass the pre-processed stream of input images to a first trained model to obtain a plurality of bounding boxes and one or more masks pertaining to one or more objects comprised in the pre-processed stream of input images, wherein the first trained model ranks the extracted one or more region of interests in order of confidence towards an object class, and wherein the first trained model is obtained by merging a manually annotated dataset and a labelled dataset, and training using a network comprising a region of interest extractor network and a deep network;

run one or more object property detector algorithms on the one or more masks pertaining to the one or more objects comprised in the stream of input images to detect a plurality of properties of the one or more objects comprised in the pre-processed stream of input images;

classify one or more signages comprised in the one or more masks pertaining to the one or more objects based on the properties of the one or more objects;

perform:

(i) extracting a plurality of regions of interests around the one or more signages pertaining to the one or more objects;

(ii) passing an image form of a text signage to an optical character recognition (OCR) to detect a language of the text signage with a high affinity to English language, wherein the image form of the text signage is obtained by finding similarity of words comprised in the text signage with one or more templates in each language to find the closest language;

(iii) detecting one or more texts embedded in the image form of the text signage, wherein the detected one or more texts is assigned a pre-specified cluster tag among a group of concepts based on a similarity matching technique in a word-vector space;

(iv) passing the one or more signages comprised in the one or more masks pertaining to the one or more objects to a second trained model, to extract a plurality of semantic attributes of a symbol comprised in the one or more signages, and wherein the second trained model is trained on a plurality of different symbols comprised in the indoor space; and (v) matching the extracted plurality of semantic attributes of the symbol with a knowledgebase to detect an image-based symbol, wherein the knowledgebase comprises textual description and a meaning specific to the matched plurality of semantic attributes of the symbol;

combine (i) an output of the optical character recognition (OCR) which includes the detected one or more texts embedded in the image form of the text signage and (ii) an output of the second trained model which includes matched plurality of semantic attributes of the symbol;

convert the combined (i) output of the optical character recognition (OCR) and (ii) the output of the second trained model into one or more facts as triples of subject-predicate-object using a Resource Description Format (RDF) technique;

infer one or more new facts from the converted one or more facts using a steam reasoning technique, based on one or more reasoning on one or more prior sensed facts and one or more current streaming sensed facts, having an expiry time, and the knowledgebase; and match one or more patterns comprised in the form of an adaptable business logic with the inferred one or more new facts using registered one or more SPARQL Protocol and Resource Description Format (RDF) Query Language (SPARQL) queries and triggering one or more alerts when the robot moves around to new view angles to inspect correctness of the one or more inferred new facts, and then transfer the alert, avoiding duplicates, avoiding duplicates.

8. The system of claim 7, wherein the plurality of scenes includes one or more wires lying on the ground, one or more unwanted items including fruit peels and plastic wrappers on floor, one or more regular lights turned on in one or more unoccupied spaces, a liquid spillage, a fire safety equipment missing, a lift or an elevator areas getting over-crowded, one or more unattended items including a smartphone, a mouse, a keyboard, a bag and a notebook.

9. The system of claim 7, wherein the plurality of properties of the one or more objects includes a color, a texture, a shape, and semantic relationship of type of the one or more objects.

10. The system of claim 7, wherein the knowledgebase is a pre-populated fact database and an ontology.

11. The system of claim 7, wherein the group of concepts includes the knowledge of an environment, the robot, one or more types of hazards, one or more rules under which the one or more alerts needs to be triggered and stored in the form of the ontology and a file comprising one or more facts.

12. The system of claim 7, wherein the plurality of semantic attributes of the symbol includes a semantic text mapped to a type of the symbol, a meaning of the symbol and a positional context in the environment.

13. One or more non-transitory machine-readable information storage mediums comprising one or more instructions which when executed by one or more hardware processors cause:

receiving a stream of input images specific to a plurality of scenes related to an indoor space from a robot mounted camera;

pre-processing the received stream of input images:

(i) resizing the received stream of input images to a pre-specific optimal dimension;

(ii) modifying the resized stream of input images based on a plurality of image spatial variations and a plurality of pixel level variations including a hue, a texture, and a gradient; and (iii) extracting one or more regions of interests from the modified stream of input images using a region of interest extractor network;

passing the pre-processed stream of input images to a first trained model to obtain a plurality of bounding boxes and one or more masks pertaining to one or more objects comprised in the pre-processed stream of input images, wherein the first trained model ranks the extracted one or more regions of interests in order of confidence towards an object class, and wherein the first trained model is obtained by merging a manually annotated dataset and a labelled dataset, and training using a network comprising a region of interest extractor network and a deep network;

running one or more object property detector algorithms on the one or more masks pertaining to the one or more objects comprised in the pre-processed stream of input images to detect a plurality of properties of the one or more objects comprised in the pre-processed stream of input images;

classifying one or more signages comprised in the one or more masks pertaining to the one or more objects based on the properties of the one or more objects;

performing:

(i) extracting a plurality of regions of interests around the one or more signages pertaining to the one or more objects;

(ii) passing an image form of a text signage to an optical character recognition (OCR) to detect a language of the text signage with a high affinity to English language, wherein the image form of the text signage is obtained by finding similarity of words comprised in the text signage with one or more templates in each language to find the closest language;

(iii) detecting one or more texts embedded in the image form of the text signage, wherein the detected one or more texts is assigned a pre-specified cluster tag among a group of concepts based on a similarity matching technique in a word-vector space;

(iv) passing the one or more signages comprised in the one or more masks pertaining to the one or more objects to a second trained model, to extract a plurality of semantic attributes of a symbol comprised in the one or more signages, and wherein the second trained model is trained on a plurality of symbols comprised in the indoor space; and (v) matching the extracted plurality of semantic attributes of the symbol with a knowledgebase to detect an image-based symbol, wherein the knowledgebase comprises textual description and a meaning specific to the matched plurality of semantic attributes of the symbol;

combining (i) an output of the optical character recognition (OCR) which includes the detected one or more texts embedded in the image form of the text signage and (ii) an output of the second trained model which includes matched plurality of semantic attributes of the symbol;

converting the combined (i) output of the optical character recognition (OCR) and (ii) the output of the second trained model into one or more facts as triples of subject-predicate-object using a Resource Description Format (RDF) technique;

inferring one or more new facts from the converted one or more facts using a steam reasoning technique, based on one or more reasoning on one or more prior sensed facts and one or more current streaming sensed facts, having an expiry time, and the knowledgebase; and matching one or more patterns comprised in the form of an adaptable business logic with the one or more inferred new facts using registered one or more SPARQL Protocol and Resource Description Format (RDF) Query Language (SPARQL) queries and triggering one or more alerts, when the robot moves around to new view angles to inspect correctness of the one or more inferred new facts, and then transfer the alert avoiding duplicates.

14. The one or more non-transitory machine-readable information storage mediums of claim 13, wherein the plurality of scenes includes one or more wires lying on the ground, one or more unwanted items including fruit peels and plastic wrappers on floor, one or more regular lights turned on in one or more unoccupied spaces, a liquid spillage, a fire safety equipment missing, a lift or an elevator areas getting over-crowded, one or more unattended items including a smartphone, a mouse, a keyboard, a bag and a notebook.

15. The one or more non-transitory machine-readable information storage mediums of claim 13, wherein the plurality of properties of the one or more objects includes a color, a texture, a shape, and a semantic relationship of type of the one or more objects.

16. The one or more non-transitory machine-readable information storage mediums of claim 13, wherein the knowledgebase is a pre-populated fact database and an ontology.

17. The one or more non-transitory machine-readable information storage mediums of claim 13, wherein the group of concepts includes the knowledge of an environment, the robot, one or more types of hazards, one or more rules under which the one or more alerts needs to be triggered and stored in the form of the ontology and a file comprising one or more facts.

18. The one or more non-transitory machine-readable information storage mediums of claim 13, wherein the plurality of semantic attributes of the symbol includes a semantic text mapped to a type of the symbol, a meaning of the symbol and a positional context in the environment.

* * * * *